Patented July 3, 1923.

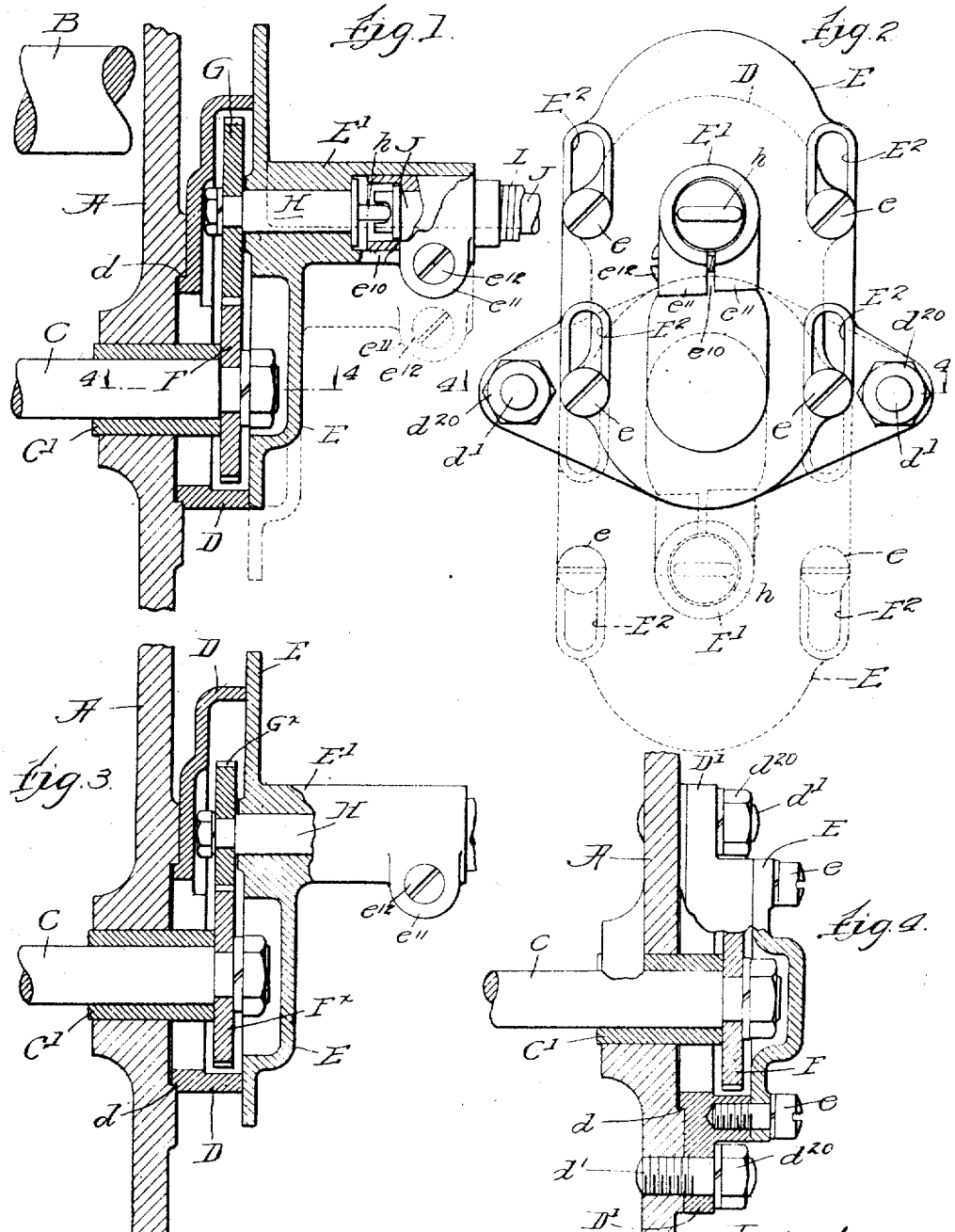

1,460,523

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

TRANSMISSION DRIVE FOR SPEEDOMETERS AND THE LIKE.

Application filed April 3, 1922. Serial No. 549,193.

*To all whom it may concern:*

Be it known that I, FREDERIK G. WHITTINGTON, a citizen of the United States, having residence in Evanston, in the county of Cook and the State of Illinois, have invented certain new and useful Improvements in Transmission Drives for Speedometers and the like, of which the following is a specification, reference being had to the accompanying drawings, forming a part thereof.

The purpose of this invention is to provide an improved construction of transmission drive connections for a speedometer or other instrument carried on an automotive vehicle. It consists in the elements and features of construction shown and described, as indicated in the claims.

In the drawings:—

Figure 1 is a section axial with respect to two shafts shown therein, through one wall of the transmission casing, and a supplemental housing member mounted thereon, embodying the features of this invention.

Figure 2 is a face elevation of the supplemental housing member shown in Figure 1.

Figure 3 is a view similar to Figure 1, showing the supplemental housing adjusted for accommodating and containing a pair of intermeshing gears on similar diameters from those shown in Figure 1.

Figure 4 is a section at the line, 4—4, on Figures 1 and 2.

The drawings show one wall of the transmission case, A, in which there is a fore-and-aft propeller shaft indicated in general as to its direction at B, and in which there is journaled a driven shaft shown at C in one of its bearings provided by bushings, $C^1$, in the wall of the transmission casing, A. D and E are two members of a supplemental gear housing which is mounted upon the outer face of the wall of the transmission casing, A, for swiveling about the axis of the shaft, C, as indicated by the annular rabbet engagement of the member, D, on said supplemental housing, with the transmission casing wall at $d$. This supplemental housing member, D, beside being seated at the engaged rabbets, as shown, against the transmission case wall, is secured to the transmission casing by a bolt, $d^1$, $d^1$, connecting through oppositely protruding lugs, $D^1$, $D^1$, of said housing member, D. Said housing member being demountable on this casing by withdrawing the nuts, $d^{20}$, from said bolts; and said housing member adapted to be reversed in position so as to extend either way from said securing bolt, as indicated by the full line and dotted line position of said housing member in Figure 2. The outer or cover member, E, of the supplemental housing is secured to the member, D, by bolts, $e$, at four corners of said cover member, taking through parallel elongated slots, $E^2$, whereby the cover member is adapted to be adjusted within the range of these slots transversely with respect to the axis of the shaft, C. This adjustment is provided in view of the journaling in said cover member, E, in a journaling boss, $E^1$, of a driven shaft, H, which at its inner end protrudes into the housing chamber, and at its outer end is adapted, as shown at $h$, for coupling with a shaft, J, to be driven thereby being the rotating member of a flexible shaft whose casing member, L, is adapted to be secured tightly in said swivel boss by the splitting of said boss as seen at $e^{10}$, providing it with lugs $e^{11}$, $e^{11}$, at opposite sides of the split which are clamped together by a bolt, $e^{12}$, to grip the flexible shaft casing, L. On the protruding end of the shaft, B, within the supplemental housing, and on the intruded end of the shaft, H, within said housing there are demountably mounted intermeshing gears, F and G, respectively, by which rotation is transmitted from the shaft, B, to the flexible shaft connection, as described for driving the speedometer.

It will be understood from the foregoing description that the entire supplemental housing is designed to be mounted projecting in either lateral direction from the shaft, B, according to whether the speedometer or other instrument to be driven is located at one side or the other of the vehicle.

It will also be understood that for substituting gears, G and F, of different diameters from those which may be in any instance employed, the cover member, E, would be detached and the proper gears substituted on the protruding and protruded ends of shafts, C and H, and the cover member re-applied and adjusted longitudinally in the slotted bolt hole, according to the requirement of the sum of the diameters of the two gears substituted.

I claim:—

1. In combination with a transmission casing and a power shaft journaled therein and protruding at one end therefrom; a supplemental gear housing mounted against the outer side of the frame enclosing said protruded shaft; a cover plate for said housing mounted slidably on the supplemental housing; a driven shaft journaled in said cover plate intruding at one end into the housing chamber, and accessible at the other end for coupling, and a pair of intermeshing gears demountably mounted on said protruding and intruding shaft ends respectively.

2. In combination with the transmission casing, a power driven shaft journaled therein and protruding at one end therefrom; a supplemental gear housing mounted against the outer side of said casing enclosing said protruding shaft; a cover member for said housing mounted slidably on said supplemental housing and means for securing it at any position within the range of its slidability; a driven shaft journaled in said cover member intruding at one end into the housing chamber, and accessible at the outer end for coupling, and a pair of intermeshing gears demountably mounted on said protruding and intruding shaft ends respectively; whereby said intermeshing gears in the housing may be readily replaced by the gears of different diameters for varying the speed transmitted to said driven shaft.

3. In combination with the transmission casing and a fore-and-aft power shaft journaled therein and protruding at one end therefrom, a supplemental gear housing swiveled against the case about the axis of said protruding shaft, and provided with means for securing it rigidly to the case at a plurality of positions about said axis; a gear on a protruding end of said shaft within said supplemental gear housing; a driven shaft journaled in said supplemental gear housing and intruding at one end into the housing chamber, and accessible at the outer end for coupling, and a pair of intermeshing gears in said supplemental housing on said protruding and intruding shaft heads respectively.

4. In combination with the transmission casing and a power shaft journaled therein and protruding at one end therefrom, a supplemental gear housing swiveled about the axis of said protruding shaft, and provided with means for securing it rigidly to the case at a plurality of positions about said axis; a cover member for said supplemental housing mounted slidably thereon; a driven shaft journaled in said cover member and intruding at one end into the housing chamber, and accessible at the other end for coupling, and a pair of intermeshing gears, demountably mounted on said protruding and intruding shafts respectively in the housing chamber.

In testimony whereof, I have hereunto set my hand at Chicago, Illinois, this 30th day of March, 1922.

FREDERIK G. WHITTINGTON.